US012770072B2

(12) United States Patent
Roy

(10) Patent No.: US 12,770,072 B2
(45) Date of Patent: Oct. 20, 2026

(54) OVERLAP OPTIMIZATION OF VEHICLE ROUTES

(71) Applicant: MARA Labs, Inc., Bengaluru (IN)

(72) Inventor: Abhishek Roy, Mumbai (IN)

(73) Assignee: MARA Labs, Inc., Bengaluru (IN)

( * ) Notice: Subject to any disclaimer, the term of this patent is extended or adjusted under 35 U.S.C. 154(b) by 643 days.

(21) Appl. No.: 17/930,138

(22) Filed: Sep. 7, 2022

(65) Prior Publication Data

US 2024/0020591 A1 Jan. 18, 2024

(30) Foreign Application Priority Data

Jul. 15, 2022 (IN) ............................. 202241040578

(51) Int. Cl.
*G06Q 10/047* (2023.01)
*G01C 21/34* (2006.01)

(52) U.S. Cl.
CPC ....... *G06Q 10/047* (2013.01); *G01C 21/3453* (2013.01)

(58) Field of Classification Search
None
See application file for complete search history.

(56) References Cited

U.S. PATENT DOCUMENTS 6,182,008 B1 * 1/2001 Nikiel .................. G06Q 10/047 73/178 R
7,013,451 B1 * 3/2006 Teig ....................... G06F 30/394 716/129
7,363,126 B1 4/2008 Zhong et al.
11,663,538 B2 * 5/2023 McSwiggan ... G06Q 10/063116 705/7.14
11,928,693 B1 * 3/2024 Savchenko ............ G06Q 50/26
2005/0216182 A1 * 9/2005 Hussain ................. G01C 21/20 701/532
2017/0123421 A1 * 5/2017 Kentley ............... G05D 1/0011
2019/0066041 A1 * 2/2019 Hance ..................... B65G 1/137
2019/0228375 A1 * 7/2019 Laury .................. G05D 1/0088
2020/0124429 A1 * 4/2020 Zhang .................. G06Q 10/047
2021/0004763 A1 * 1/2021 Kannan .............. G06Q 10/0838
2021/0108935 A1 * 4/2021 Koohi .................. G06Q 10/047
(Continued)

FOREIGN PATENT DOCUMENTS

CN 105701204 A * 6/2016 ............. G06F 16/29

OTHER PUBLICATIONS

Machine translation of CN-105701204-A (Year: 2016).*
(Continued)

*Primary Examiner* — Christian Chace
*Assistant Examiner* — Scott R Jagolinzer
(74) *Attorney, Agent, or Firm* — The Webb Law Firm

(57) ABSTRACT

Apparatuses, methods, and systems for optimizing vehicle route overlap in vehicle routing plans are disclosed. A method comprises selecting a first vehicle route and a second vehicle route of a plurality of vehicle routes using a plurality of overlap metrics, reallocating destination nodes of the first vehicle route and the second vehicle route to a first new route and a second new route using an ordered projection of the destination nodes onto a line passing through the first vehicle route and the second vehicle route, and determining an overlap-optimized vehicle routing plan including the first new route and the second new route.

18 Claims, 7 Drawing Sheets

(56) References Cited

U.S. PATENT DOCUMENTS

| | | | | |
|---|---|---|---|---|
| 2022/0101249 | A1* | 3/2022 | Wuorinen | G01P 15/00 |
| 2022/0156693 | A1* | 5/2022 | Singh | G06Q 30/0205 |
| 2022/0391785 | A1* | 12/2022 | Moton, Jr. | G06Q 10/06312 |
| 2023/0236599 | A1* | 7/2023 | Ma | G05D 1/0027 701/21 |
| 2023/0304806 | A1* | 9/2023 | Chakraborty | G01C 21/3492 |
| 2023/0316215 | A1* | 10/2023 | Kwatra | G06Q 30/0208 705/330 |
| 2023/0366687 | A1* | 11/2023 | Fernandez Gonzalez | G06N 20/00 |

OTHER PUBLICATIONS

Kokiopoulou et al., Orthogonal Neighborhood Preserving Projections: A Projection-Based Dimensionality Reduction Technique, IEEE Transactions on Pattern Analysis and Machine Intelligence, vol. 29, No. 12, Dec. 2007 (Year: 2007).*

Constantino, Miguel , et al., “The mixed capacitated arc routing problem with non-overlapping routes”, Constantino et al. “The mixed capacitated arc routing problem with non-overlapping routes” European Journal of Operational Research vol. 244, Issue 2, pp. 445-456, Jul. 16, 2015.

Kim, Byung-In , et al., “Waste collection vehicle routing problem with time windows”, Kim et al. “Waste collection vehicle routing problem with time windows” Computers & Operations Research 33 (2006) pp. 3624-3642, Nov. 21, 2005.

Vidal, Thibaut , et al., “A concise guide to existing and emerging vehicle routing problem variants”, Vidal el al. “A concise guide to existing and emerging vehicle routing problem variants” European Journal of Operational Research, 40 pgs, Apr. 5, 2020.

* cited by examiner

OVERLAP OPTIMIZATION OF VEHICLE ROUTES

CROSS-REFERENCE TO RELATED APPLICATIONS

The present application claims priority to and the benefit of Indian Patent Application No. 202241040578, filed Jul. 15, 2022, the disclosure of which is hereby incorporated by reference.

TECHNICAL FIELD

The present application relates to optimization of vehicle route overlap in vehicle routing plans as well as to apparatuses, methods, systems, and techniques pertaining thereto.

BACKGROUND

The vehicle routing problem and variants thereof, such as the vehicle routing problem with time windows, are important aspects of modern supply chain optimization. In an example formulation of such problems, a fleet of vehicles starts at a common warehouse and delivers goods to various locations. The volumes of goods to be delivered to each location, the travel times between each pair of locations, the transaction time taken at each of them, the time windows for the execution of each task (for variants such as the vehicle routing problem with time windows), as well the operating time shifts of each vehicle, are generally specified as part of the problem.

A feasible solution to such problems must respect the hard constraints (e.g., the shift time limits establishes for drivers or weight or mass capacity limits of a delivery vehicles). Since such vehicle routing problems are known to have nondeterministic polynomial time (NP) complexity, finding the exact minimum is impossible within commercial timeframes. Thus, all practical solutions must use approximations. Such approximations typically focus on finding a feasible solution that approximately minimizes the total distance traveled by the fleet as a primary goal.

Real-world routing objectives are more complex and varied than those assumed by conventional routing problem solutions. For example, inadequate attention has been given to objectives such as reducing or minimizing the overlap of vehicle routes included in vehicle routing solutions. Furthermore, combining such additional objectives in combination with conventional objectives and subject to conventional constraints, such as the objectives and constraints described above, further confounds the aforementioned problems adding further difficulty to their solutions. There is a longstanding unmet need for the unique apparatuses, methods, systems, and techniques disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created, and that the invention includes and protects such alterations, modifications, and further applications of the example embodiments as would occur to one skilled in the art.

SUMMARY OF THE DISCLOSURE

Some example embodiments include unique computer-based methods for optimizing vehicle route overlap in vehicle routing plans. Some example embodiments include unique computer systems configured to optimize vehicle route overlap in vehicle routing plans. Some example embodiments include non-transitory memory apparatuses configured with executable for optimizing vehicle route overlap in vehicle routing plans. Further embodiments, forms, objects, features, advantages, aspects, and benefits shall become apparent from the following description and drawings.

DETAILED DESCRIPTION OF EXAMPLE EMBODIMENTS

Figure 1:
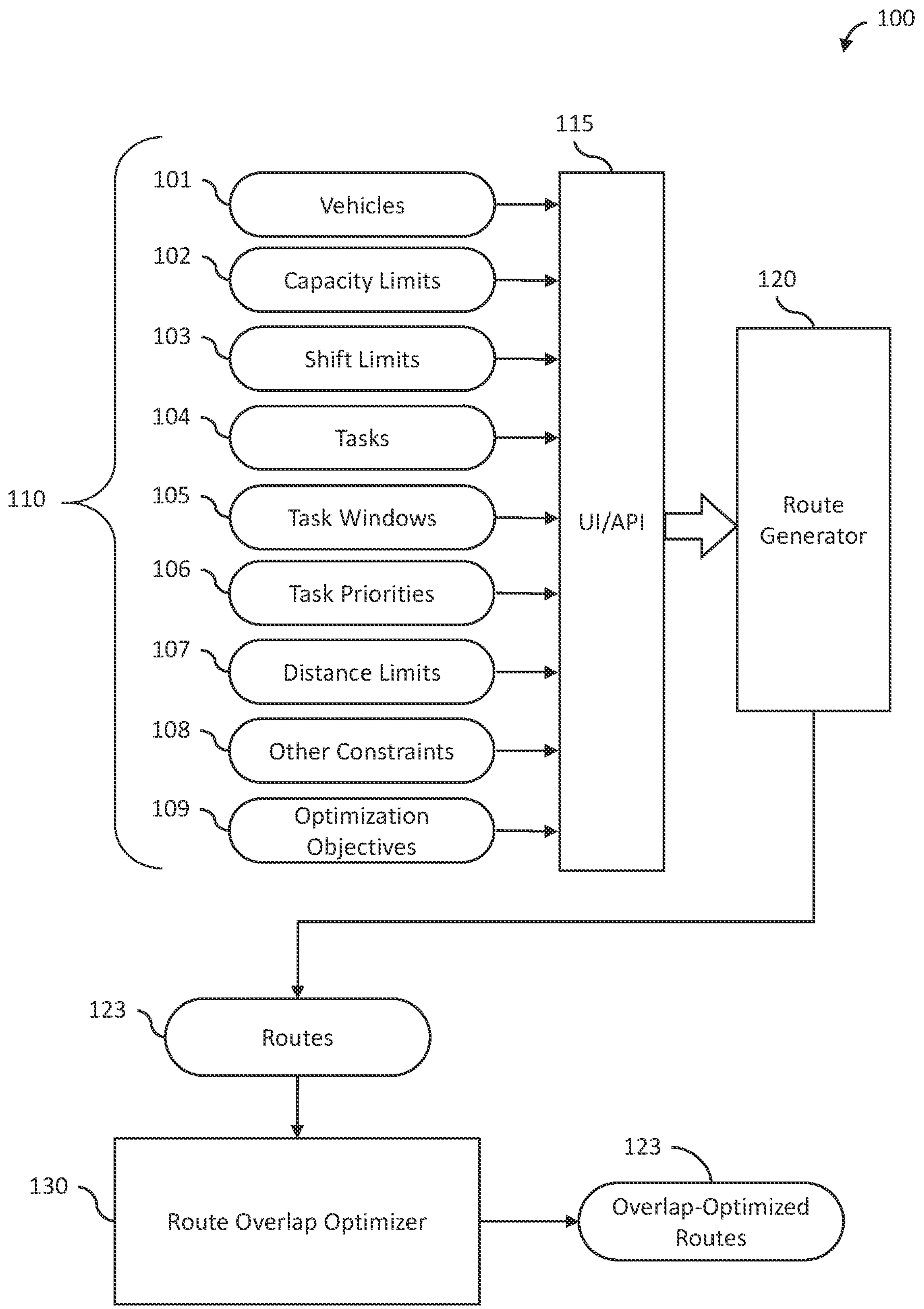
FIG. 1 is a schematic diagram depicting certain aspects of an example vehicle route optimization system.

With reference to FIG. 1, there is illustrated an example vehicle route optimization system 100 (also referred to herein as “system 100”). System 100 may be implemented an provided in a number of forms including, for example, as a cloud-based computing system, data center-based computing system, stand-alone computing system, distributed or virtual computing systems, or combinations thereof. System 100 is one example of a computer-based system configured to perform automated scheduling and dispatching of a plurality of vehicles to visit a plurality of destinations and to optimize such scheduling and dispatching with respect to a plurality of parameters.

System 100 includes a UI/API 115 which may include one or both of a user interface (UI) and application programming interface (API). UI/API 115 is configured to receive a plurality of inputs 110 which may be input by a human user or a machine-based client (e.g., a client device, program, or system). In the illustrated example, the plurality of inputs 110 include vehicles 101, capacity limits 102, shift limits 103, tasks 104, task windows 105, cost priorities 106, distance limits 107, other constraints 108, and optimization objectives 109.

Vehicles 101 include parameters of a set of vehicles to be included in vehicle route optimization. Vehicles 101 may include, for example, a uniquely identifying vehicle ID, vehicle type, vehicle class, or other vehicle identifier for each of a plurality of vehicles. Vehicles 101 may also include other vehicle-related information as will occur to one of skill in the art with the benefit and insight of the present disclosure.

Capacity limits 102 include vehicle capacity or capability parameters corresponding to respective ones of vehicles 101. Capacity limits 102 may include, for example, vehicle task capacity, vehicle volume capacity, and/or vehicle distance or range capacity or limits), and/or other vehicle-related information as will occur to one of skill in the art with the benefit and insight of the present disclosure.

Shift limits 103 include limits on the time or duration that operators are permitted to operate vehicles 101. Such limits may be imposed, for example, by regulation, contract, operator availability, and other sources of shift limits as will occur to one of skill in the art with the benefit and insight of the present disclosure.

Tasks 104 include parameters of a set of tasks to be included in a vehicle route optimization. Tasks 104 may include, for example, a set of task destinations (e.g., delivery, pickup, fueling, or other destinations), coordinate or geographic information (e.g., GPS, map area, or other geolocation information) associated with respective task destinations, associated deliveries, pick-ups, or other tasks associated with respective task destinations, and/or other task-related information as will occur to one of skill in the art with the benefit and insight of the present disclosure.

A number of other constraints may be associated with tasks 104 and vehicles 101. For example, task windows 105 may include arrival and departure times defining a window within which each task (or some tasks) must be serviced. Task priorities 106 may include priority rankings or values utilized in optimization of tasks. Distance limits 107 may include constraints on distances that a vehicle may travel. Other constraints 108 may also be included among the plurality of inputs 110 and may include for example, speed limit constraints, route time constraints (e.g., days and/or times at which access to a give route segments may be restricted or prohibited), and vehicle service duration constraints, among other constraints as will occur to one of skill in the art with the benefit and insight of the present disclosure.

Optimization objectives 109 include one or more optimization objectives, for example, rider/vehicle travel distance, rider/vehicle travel time, overlap of rider/vehicle travel routes, adherence to maximum vehicle capacity limits, minimum utilization of vehicles, balance and equality of count of tasks among the vehicles, constraints on working hours, constraints on operating duration and/or operating times, and marketplace constraints (e.g., visit locations in a dense area or cluster to be visited by as few vehicles as possible) among other parameters. Objectives 18 may further include one or more mirroring objectives, for example, a value or values, range, limit, or heuristic according to a mirroring definition such as the one of the mirroring definitions described herein below.

UI/API 115 is configured and operable to provide inputs 110 to route generator 120 which is configured to store in more or more non-transitory, computer-readable memory media a set of problem space parameters that include or are based upon inputs 110 and provide such parameters as inputs, references, or other bases upon which one or more vehicle route generation processes may operate.

Route generator 120 is configured and operable to determine a vehicle routing plan, for example, a vehicle routing plan determined by solving a vehicle routing problem (VRP) such as the pure or classical vehicle routing problem or variants thereof including, for example, the vehicle routing problem with time windows (VRPTW), the capacitated vehicle routing problem (CVRP), the capacitated vehicle routing problem with time windows (CVRPTW), and the vehicle routing problem with pickup and delivery (VRPPD), among other variations and extensions as will occur to one of skill in the art with the benefit and insight of the present disclosure.

In some embodiment, route generator 120 may solve a VRP using the data sets {F}, {T}, and {M} as inputs. The set {F} is a fleet of N vehicles (V_1, V_N) that are available for delivery, where each vehicle has a capacity (C_1, C_N), and an operating shift consisting of a start and return times. [(S_1, R_1), (S_N, R_N)]. It shall be appreciated that in a homogenous fleet the capacities and operating shifts are identical for all vehicles of the fleet, while in a heterogeneous fleet the capacities and operating shifts vary among vehicles of the fleet.

The set {T} is a set of K destination tasks (T_1, T_K) that are to be serviced by the fleet {F} where each task includes a volume of delivery (D_1, D_K), a service time needed to unload and complete the delivery (U_1, . . . U_K), and a time window of entry and leaving times between which the vehicle must arrive at the task (<E_1, . . . <E_K, L_K>).

The set {M} is set including at least one matrix of travel times [M_ij] specifying the time taken to travel between tasks T_i and T_j. The matrix of travel times [M_ij] may specify travel times between all pairs of tasks T_i and T_j in the set {T} or a subset thereof.

In response to the inputs data sets {F}, {T}, and {M}, the route generator 120 may determine a set of feasible solutions {S_F} to the VRP. A solution to the VRP is a sequence of tasks for each vehicle known as a route. A route is allowed to be empty in which case the vehicle is unused. In the following example solution, T_ij is the j'th task visited by vehicle i.

{V_1: T_11, T_12, T_13, . . .

. . .

V_N: T_N1, T_N1, T_N3, . . . }

A feasible solution must respect certain constraints for example, unique assignment of each tasks to a single vehicle, a shift time limits for vehicle operation, a vehicle capacity limits, or task window constraints. The set of feasible solution {S_F} may be determined by formally defining a solution is feasible if and only if three conditions are met: (1) each task belongs to one and only route, (2) the sum of capacities (e.g., masses and/or volumes) in each route is less than or equal to the capacity of the vehicle assigned to that route, i.e., D(T_i1)+D(T_i2)+ . . . D(T_in) <=C_i, and (3) the vehicle arrives at each task within the time window and at the end of the route within the return time. For the condition (3), the arrival times for each task in the route may be calculated as follows:

Let a vehicle arrive at Task T_i at time X followed by time Y at the next task in the route, T_j.

$$Y=\max(X+U\_i+M\_ij,E\_j)$$

In other words, the vehicle must take unloading time U_i for task T_j, travel a duration M_ij between the two tasks, and possibly wait for the entry time E_j of task T_j.

It shall be appreciated that the formal definition of feasibility utilized in constructing {S_F} in the classical or pure vehicle routing problem, the time windows and operating shifts are assumed to be infinite, and only conditions 1 and 2 are relevant. Whereas in the vehicle routing problem with time windows (VRPTW) or variants thereof, condition 3 also applies.

Route generator 120 may be further configured and operable to perform an optimization of multiple feasible solutions or to determine an optimized subset of the set of feasible solution {S_F}. Examples of such optimizations include a feasible solution that approximately minimizes the total distance traveled by the fleet, minimizes the total fuel consumed by the fleet, minimizes the total travel time of the fleet, or combinations of the foregoing and other optimization objectives.

The set of feasible solutions {S_F} or the optimized subset of the set of feasible solution {S_F} may be determined by route generator 120 and output or provided as routes 123 which, in turn, is provided as input to routes overlap optimizer 130. Routes overlap optimizer 130 may utilizes the overlap optimization techniques disclosed herein to determine and provide and output overlap-optimized routes 132.

Figure 2:
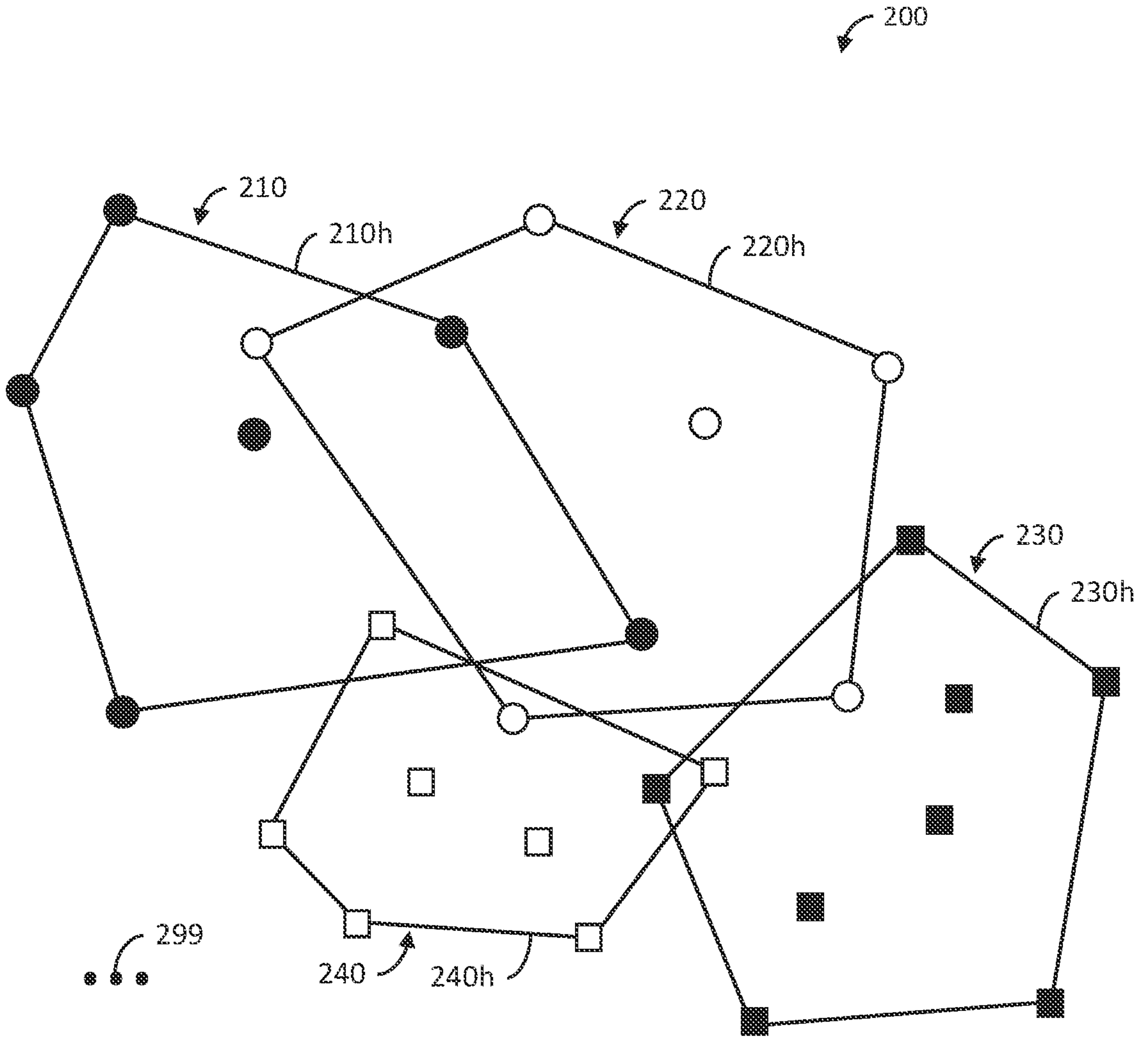
FIGS. 2, 2A, and 2B are schematic diagrams depicting certain aspects of an example set of vehicle routes.

With reference to FIG. 2, there is illustrated an example set of vehicle routes 200. In the illustrated embodiment, vehicle routes 200 include route 210, route 220, route 230, and route 240, it being appreciated that vehicle routes 200 represent a relatively simple set of routes and that a greater numbers of routes, or in some cases fewer, may be present in sets of vehicle routes according to the present disclosure as generally indicated by ellipsis 299. FIG. 2 nevertheless provides a useful example for purposes of describing measurement and quantification of route overlap according to the present disclosure.

Figure 2A:
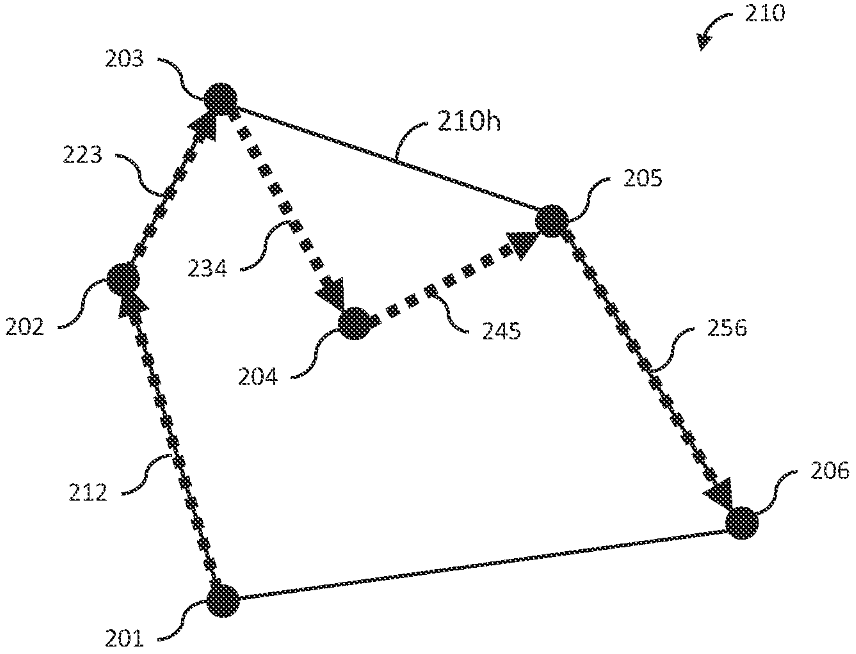
Figure 2B:
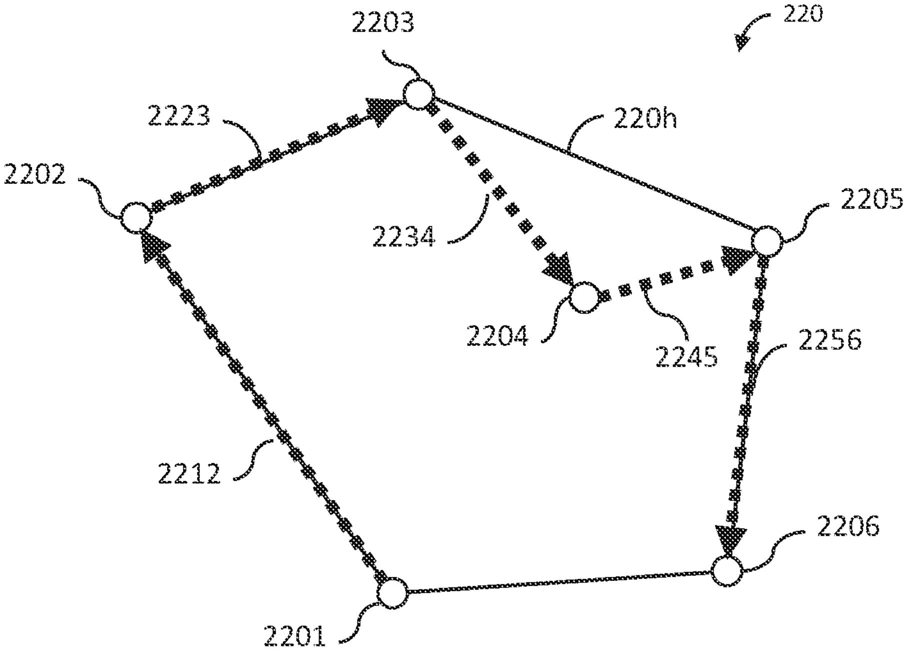

As illustrated more particularly in FIGS. 2A and 2B, each route includes a plurality of task destination nodes (also referred to herein as destination nodes). For example, as illustrated in FIG. 2A, route 210 includes task destination nodes 201, 202, 203, 204, 205, and 206. Similarly, as illustrated in FIG. 2B, route 220 includes task destination nodes 2201, 2202, 2203, 2204, 2205, and 2206.

Each route also includes a sequence of route segments indicating the sequence in which a vehicle travels between or visits the task destination nodes. For example, as illustrated in FIG. 2A, route 210 includes route segments 212, 223, 234, 245, and 256 extending, respectively, between task destination nodes 201 and 202, 202 and 203, 203 and 204, 204 and 205, and 205 and 206. Similarly, as illustrated in FIG. 2B, route 220 includes route segments 2212, 2223, 2234, 2245, and 2256 extending, respectively, between task destination nodes 2201 and 2202, 2202 and 2203, 2203 and 2204, 2204 and 2205, and 2205, and 2206.

Each route also includes a polygonal hull defining a perimeter of an area of a route. For example, as illustrated in FIGS. 2, route 210 includes a hull 210*h* (also illustrated in FIG. 2A), route 220 includes a hull 220*h* (also illustrated in FIG. 2B), route 230 includes a hull 230*h*, and route 240 includes a hull 240*h*. It shall be appreciated that the hull of a route may coincide with one or more route segments of that route, but that the route segments may also define separate paths between task destination nodes internal to the hulls. Task destination nodes and hulls may be utilized in computing vehicle route overlap.

Two vehicle routes may be said to overlap if they visit the same region. This concept can be quantified and measured according to the following procedure. First, convex hulls (H_1, . . . H_n) of each a plurality of routes (R_1, . . . R_n) are constructed, for example, using the latitude, longitude coordinates of each task destination node. In the illustrated example, convex hull 210*h* is constructed for route 210, convex hull 220*h* is constructed for route 220, convex hull 230*h* is constructed for route 230, and convex hull 240*h* is constructed for route 240. Second, the an overlap metric (O) is calculated for each pair of hulls (H_a, H_b) as the number of nodes of a first hull of the pair (nnH_a) contained in a second hull of the pair (H_b) plus the number of nodes of the second hull of the pair (nnH_b) contained in the first hull of the pair (H_a), for example, in accordance with equation (1):

$$O=(nnH\_a \in H\_b)+(nnH\_b \in H\_a) \quad (1)$$

The foregoing procedure can be utilized to calculated set of overlap metrics of all hull pairs of a set of vehicle routes {O_ab, . . . O_nm}. For example, applying the foregoing procedure to vehicle routes 200, the metrics set forth in Table 1 below can be calculated.

TABLE 1

| Hull Pair (a, b) | Value of nnH_a ∈ H_b | Value of nnH_b ∈ H_a | Value of O |
|---|---|---|---|
| 210h, 220h | 2 | 1 | 3 |
| 210h, 230h | 0 | 0 | 0 |
| 210h, 240h | 0 | 1 | 1 |
| 220h, 230h | 1 | 0 | 1 |
| 220h, 240h | 1 | 0 | 1 |
| 230h, 240h | 1 | 1 | 2 |

It shall be appreciated that the sequence in which nodes are serviced (e.g., the sequence of deliveries or visits to the nodes of a given route) need not be and preferably is not considered in calculating overlap metric (O) and the metric is preferably independent of such sequences parameters. It shall also be appreciated that overlap metrics accounting for overlaps that do not have nodes contained in other hulls (e.g., the nodeless overlap of hull 230*h* into hull 220*h*) may also be utilized. Such metrics may, for example, compute overlap by considering an area of intersection as overlap. A variety of other overlap metrics permitting ordering or ranking of overlap from greatest to least could be utilized as will occur to one of skill in the art with the benefit and insight of the present disclosure.

Figure 3A:
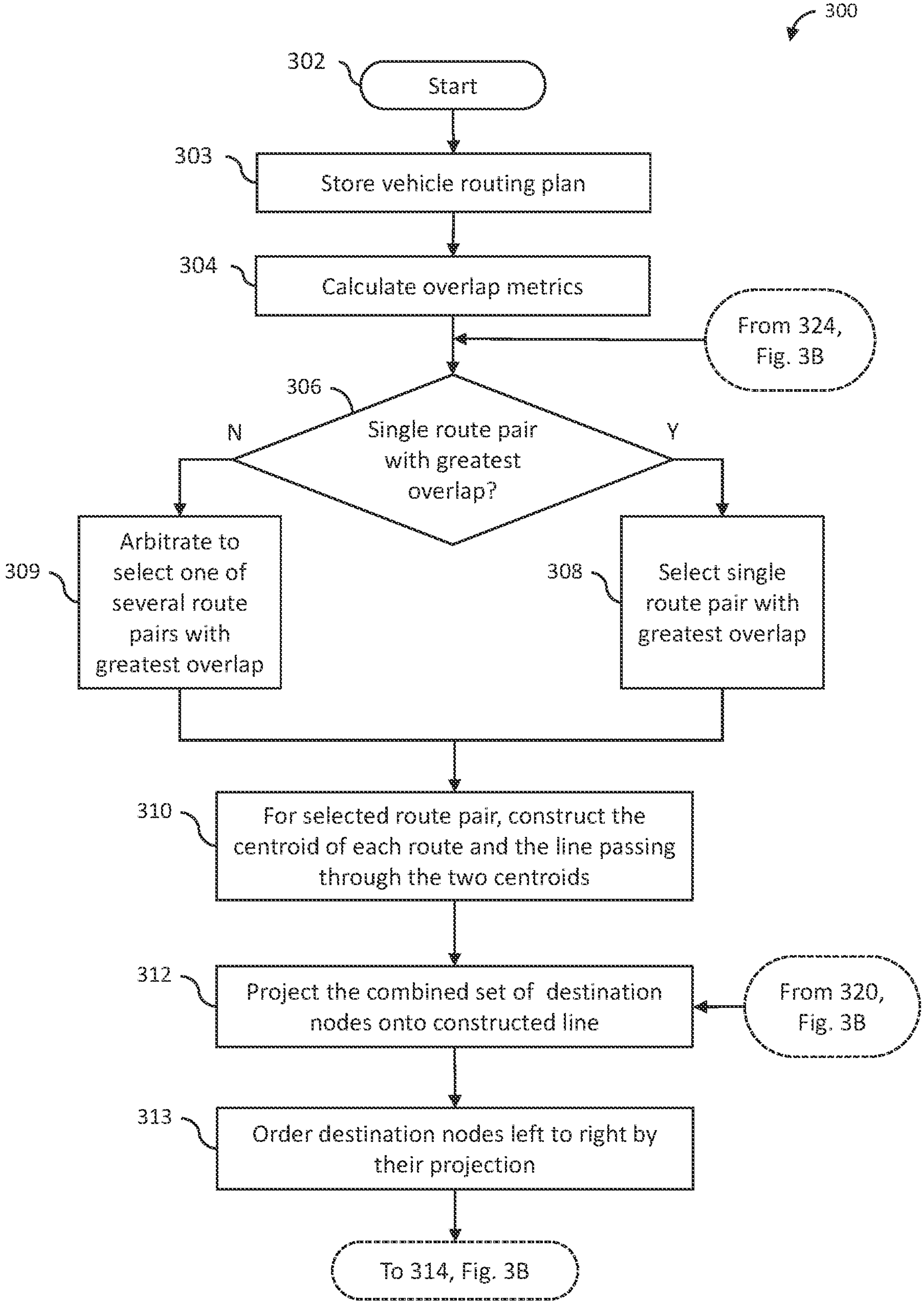
FIGS. 3A and 3B are flow diagrams depicting certain aspects of an example vehicle route optimization process.
Figure 3B:
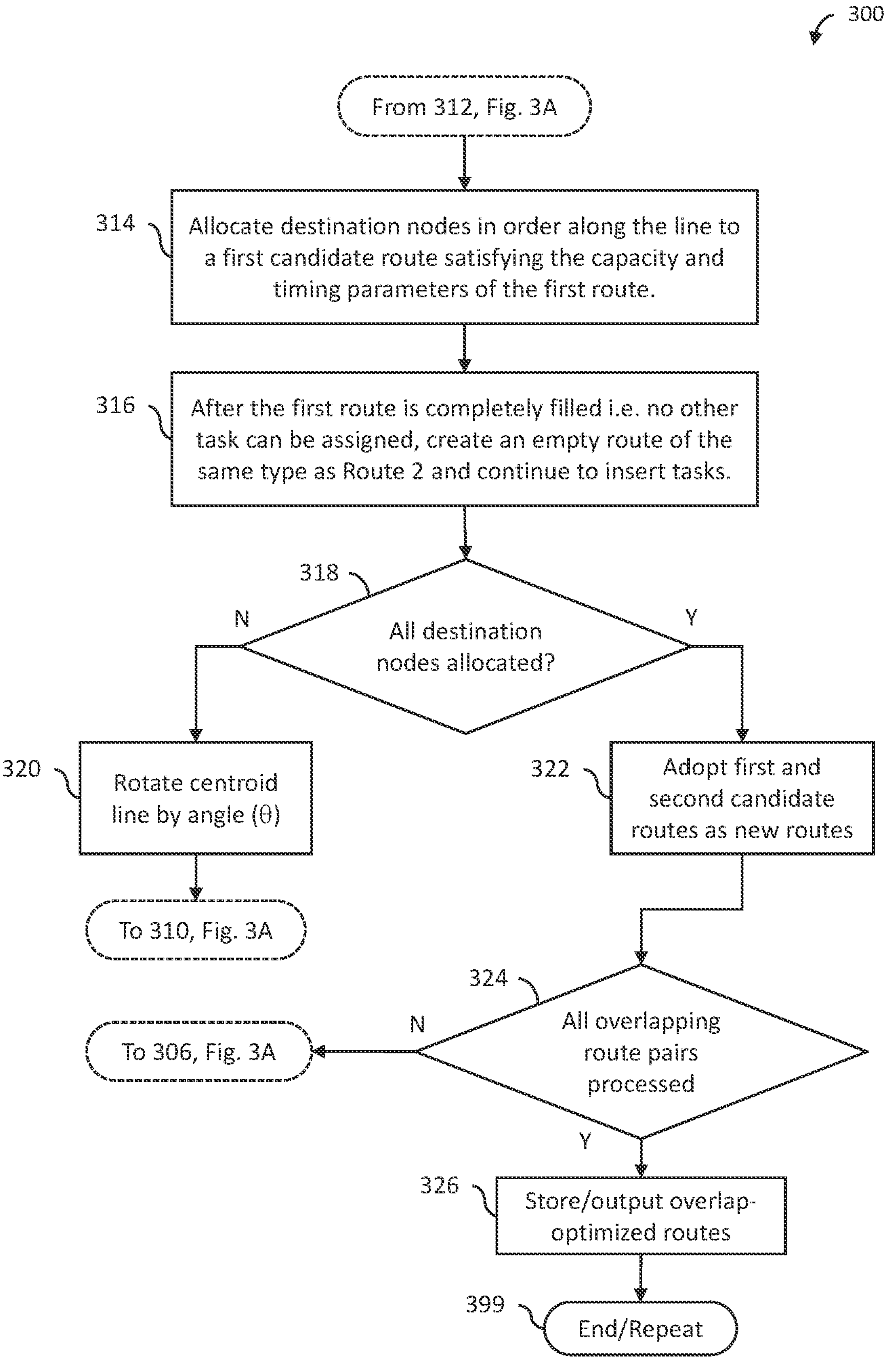

With reference to FIGS. 3A and 3B, there is illustrated an example process 300 which may be implemented and performed by one or more components of by a vehicle route optimization system, such as system 100 or another vehicle route optimization system. It shall be further appreciated that process 300 is one example of a method of optimizing vehicle route overlap in vehicle routing plans according to the present disclosure.

Process 300 begins at start operation 302 and proceeds to operation 303 at which a vehicle routing plan including a plurality of vehicle routes is stored in a non-transitory memory medium. The vehicle routing plan may be optimized according to at least one optimization criterion other than an overlap criterion. Each of the plurality of vehicle routes includes a plurality of destination nodes for a respective vehicle and satisfies capacity and timing parameters for the respective vehicle to serve the plurality of destination nodes. In some embodiments, the vehicle routing plan may comprise or may consist of routes 123 which as noted above, may be optimized according to a number of criterial including minimizing total fleet distance, minimizing total fleet fuel consumption, minimizing the total travel time of the fleet, or combinations of the foregoing and other optimization objectives.

From operation 303, process 300 proceeds to operation 304 which computes a plurality of overlap metrics of the plurality of vehicle routes. Operation 304 may compute the plurality of overlap metrics of the plurality of vehicle routes using a number of techniques such as those described above in connection with FIG. 2.

From operation 304, process 300 proceeds to conditional 306 which evaluates the overlap metrics calculated at operation 304 to determine whether a single route pair with the greatest overlap (as indicated by their associated overlap metric) can be identified. For example, as described above in connection with FIG. 2, routes 210 and 220 may identified as a pair of vehicle routes (i.e., a first vehicle route and a second vehicle route) having the greatest overlap among the set of vehicle routes 200.

If conditional 306 evaluates affirmative, process 300 proceeds to operation 308 which selects the single route pair with the greatest overlap (i.e., a first vehicle route and a second vehicle route of the plurality of vehicle routes stored at operation 303). If conditional 306 evaluates negative, process 300 proceeds to operation 309 which arbitrates among two or more route pairs with the greatest overlap (as indicated by their associated overlap metrics) and selects one of these two or more route pairs as a selected route pair (i.e., a first vehicle route and a second vehicle route of the plurality of vehicle routes stored at operation 303).

Figure 4:
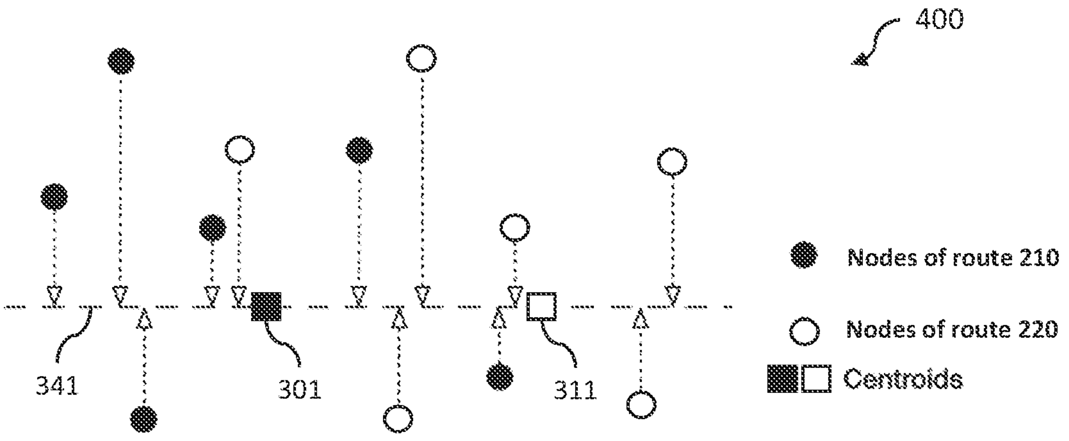
FIGS. 4-7 are schematic diagrams depicting certain aspects of example vehicle route optimization operations.
Figure 5:
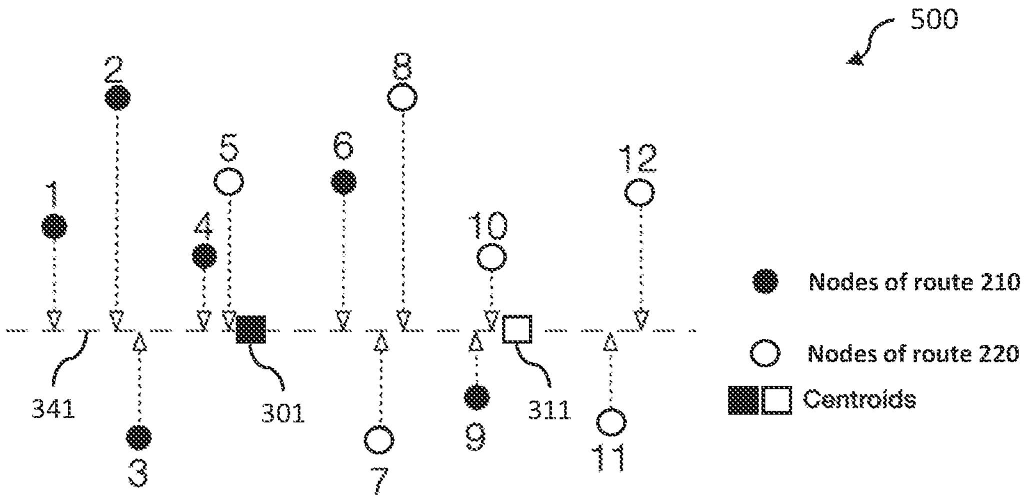
Figure 6:
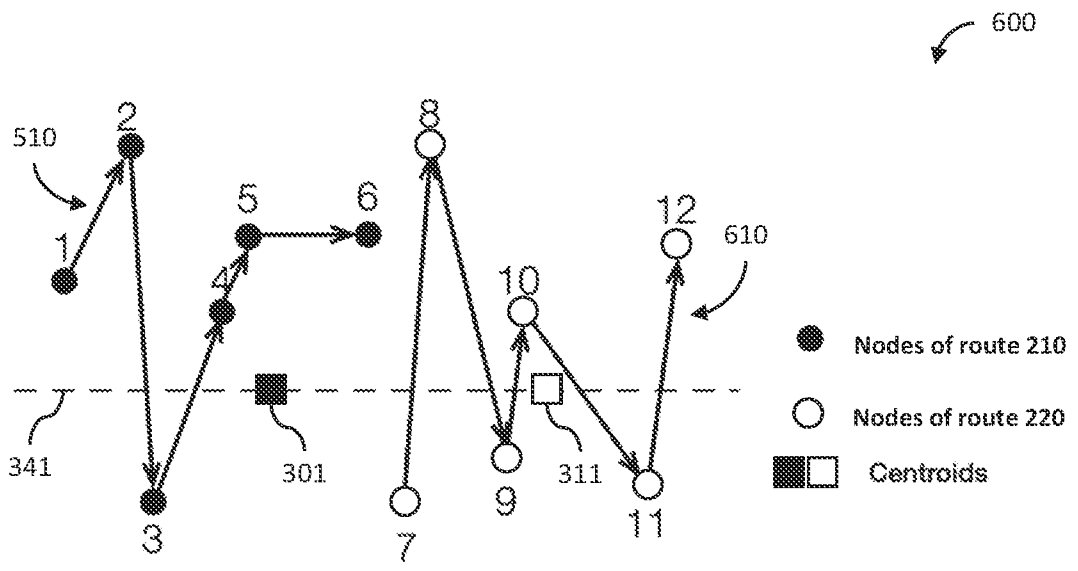
Figure 7:
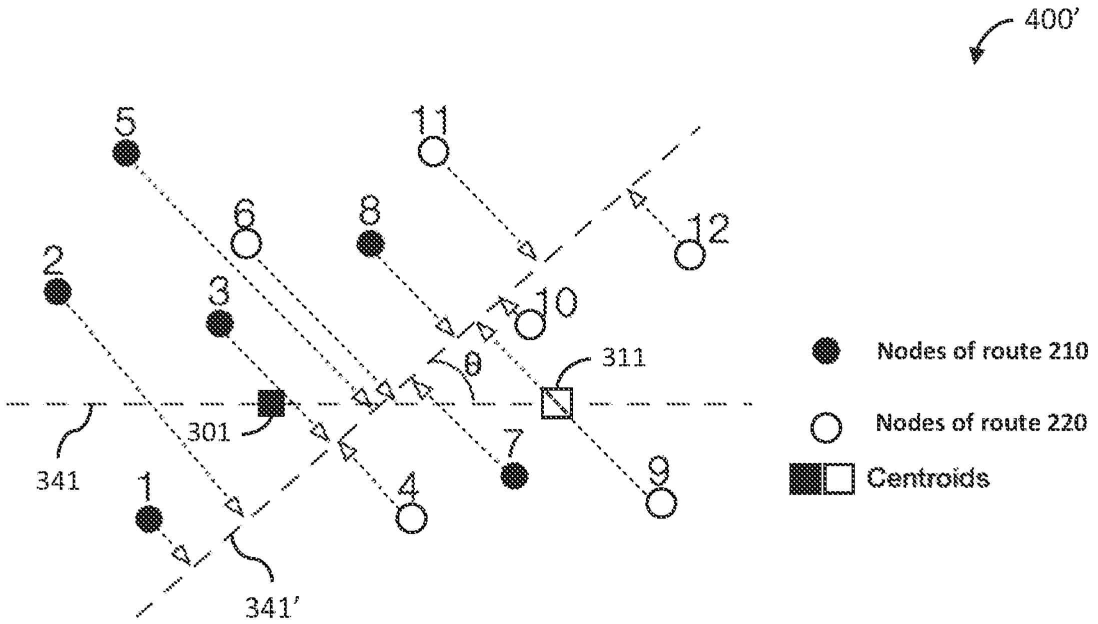

From operation 308 or operation 309, process 300 proceeds to operation 310 which constructs the centroid of each route of the selected route pair and constructs the line passing through the two centroids. FIG. 4 illustrates a graph 400 depicting a constructed centroid 301 of a vehicle route 210 and a constructed centroid 311 of vehicle route 220. These features are also illustrated in FIGS. 5-7 which are further referenced below.

From operation 310, process 300 proceeds to operation 312 which determines projections of the destination nodes of the selected first vehicle route and second vehicle route onto the line constructed at operation 310. Graph 400 of FIG. 4 depicts a constructed line 341 intersecting the constructed centroids 301, 311 and projections of the destination nodes of route 210 and route 220 onto line 341. These features are also illustrated in FIGS. 5-7 which are further referenced below.

From operation 312, process 300 proceeds to operation 313 which orders the destination nodes along the line according to the projections. FIG. 5 illustrates a graph 500 generally corresponding to graph 400, but with the destination nodes of route 210 and route 220 sequentially ordered 1 through 12 along the length of line 341. These features are also illustrated in FIGS. 6 and 7 which are further referenced below.

From operation 313, process 300 proceeds to operation 314 which allocates the ordered destination nodes in order along the line to a first candidate route. The first candidate route is configured to satisfy the capacity and timing parameters of the first vehicle route. The allocation of operation 314 may continue until respective limits on one of the capacity and timing parameters of the first candidate route are reached. FIG. 6 illustrates a graph 600 generally corresponding to graph 500, but with destination nodes 1 through 6 assigned to a first candidate route 510.

From operation 314, process 300 proceeds to operation 316 which continues allocation the ordered destination nodes in order along the line now to a second candidate route and a second candidate route. The second candidate route is configured to satisfy the capacity and timing parameters of the second vehicle route. The allocation of operation 316 may continue until respective limits on one of the capacity and timing parameters of the second candidate route are reached. Graph 600 of FIG. 6 illustrates destination nodes 7 through 12 assigned to a second candidate route 610.

From operation 316, process 300 proceeds to conditional 318 which evaluates whether all of the ordered destination nodes have been allocated to the first candidate route and the second candidate route. If conditional 318 evaluates negative, process 300 proceeds to operation 320 which rotates the line constructed at operation 310 by a specified angle. FIG. 7 illustrates a graph 400' generally corresponding to graph 400, but line 341 rotated by angle (θ) to provide line 341' and projections of the destination nodes of route 210 and route 220 onto line 341'. From operation 320, process 300 proceeds to operation 312 and further proceeds as described above.

If conditional 318 evaluates affirmative, process 300 proceeds to operation 322 which adopts the first candidate route as a first new route in place of the first vehicle route and adopts the second candidate route as a second new route in place of the second vehicle route.

From operation 322, process 300 proceeds to conditional 324 which evaluates whether all overlapping route pairs have been processed to reduce route overlap, for example, whether all route pairs with non-zero overlap metrics or non-zero overlap metrics above a threshold have been processed to reduce overlap. If conditional 324 evaluates negative, process 300 proceeds to conditional 306 and further proceeds as descried above.

If conditional 324 evaluates affirmative, process 300 proceeds to operation 326 which stores the set of overlap optimized routes in a non-transitory memory medium to provide or use in determining an overlap-optimized vehicle routing plan and may output or otherwise provide the overlap-optimized vehicle routing plan to control dispatch of a plurality of vehicles. From operation 326, process 300 proceeds to operation 399 where process 300 ends or repeats.

In the foregoing example, the operations of process 300 including operation 306 and subsequent operations provide one example of reallocating destination nodes of a first vehicle route and a second vehicle route to a first new route and a second new route using an ordered projection of the destination nodes onto a line passing through the first vehicle route and the second vehicle route wherein the first new route satisfying first capacity and timing parameters of the first vehicle route and the second new route satisfying second capacity and timing parameters of the first vehicle route. Other examples contemplate a number of other sub-processes providing such reallocation. For example, sub-processes in which the above-described operations and conditionals are modified, reordered, or replaced with alternative operations and conditionals providing comparable or varied capabilities.

In the foregoing example, the operations of process 300 including operation 306 through operation 326 provide an example of controls comprising repeating an allocation with a centroid line rotated by an angle if the allocating does not successfully allocate all of the destinations nodes, and adopting the first candidate route as the first new route and the second candidate route as the second new route if the allocating accounts for all of the destinations nodes. Other examples contemplate a number of other sub-processes providing such conditional repeating or adopting.

As shown by this detailed description, the present disclosure contemplates multiple and various embodiments, including, without limitation, the following example embodiments. A first example embodiment is a method for optimizing vehicle route overlap in vehicle routing plans, the method comprising: storing in a non-transitory memory medium a vehicle routing plan including a plurality of vehicle routes, the vehicle routing plan being optimized according to at least one optimization criterion other than an overlap criterion, each of the plurality of vehicle routes including a plurality of destination nodes for a respective vehicle and satisfying capacity and timing parameters for the respective vehicle to serve the plurality of destination nodes; computing a plurality of overlap metrics of the plurality of vehicle routes; selecting a first vehicle route and a second vehicle route of the plurality of vehicle routes using the plurality of overlap metrics; reallocating the destination nodes of the first vehicle route and the second vehicle route to a first new route and a second new route using an ordered projection of the destination nodes onto a line passing through the first vehicle route and the second vehicle route, the first new route satisfying first capacity and timing parameters of the first vehicle route, the second new route satisfying second capacity and timing parameters of the first vehicle route; determining an overlap-optimized vehicle routing plan including the first new route and the second new route; and providing the overlap-optimized vehicle routing plan to control dispatch of a plurality of vehicles.

A second example embodiment includes the features of the first example embodiment, wherein the reallocating comprises: constructing the line to intersect a first centroid of the first vehicle route and a second centroid of the second vehicle route; determining projections of the destination nodes of the first vehicle route and the second vehicle route onto the line; ordering the destination nodes along the line according to the projections; and allocating the destination nodes in order along the line to a first candidate route and a second candidate route, the first candidate route satisfying the first capacity and timing parameters of the first vehicle route, the second candidate route satisfying the second capacity and timing parameters of the first vehicle route.

A third example embodiment includes the features of the second example embodiment, wherein the reallocating comprises: repeating the allocating with the line rotated by an angle if the allocating does not successfully allocate all of the destinations nodes; and adopting the first candidate route as the first new route and the second candidate route as the second new route if the allocating accounts for all of the destinations nodes.

A fourth example embodiment includes the features of the first example embodiment and further comprises repeating the selecting and the reallocating for additional pairs of vehicle routes; wherein the determining the overlap-optimized vehicle routing plan further includes additional pairs of new routes determined by the repeating the reallocating for the additional pairs of vehicle routes.

A fifth example embodiment includes the features of the fourth example embodiment, wherein the repeating is performed to account for all vehicle routes having an overlap metric satisfying an overlap optimization criterion.

A sixth example embodiment includes the features of the first example embodiment, wherein the computing the plurality of overlap metrics includes computing an overlap of polygonal hulls defining perimeters of respective vehicle routes.

A seventh example embodiment includes the features of the sixth example embodiment, wherein each of the plurality of overlap metrics accounts for a number of destination nodes of one vehicle route encroaching on the perimeter of another vehicle route.

A eighth example embodiment is a system for optimizing vehicle route overlap in vehicle routing plans, the system comprising: a non-transitory memory medium configured to store instructions for processing a vehicle routing plan including a plurality of vehicle routes, the vehicle routing plan being optimized according to at least one optimization criterion other than an overlap criterion, each of the plurality of vehicle routes including a plurality of destination nodes for a respective vehicle and satisfying capacity and timing parameters for the respective vehicle to serve the plurality of destination nodes; and one or more processors configured to execute the instructions stored in the non-transitory memory medium to: compute a plurality of overlap metrics of the plurality of vehicle routes; select a first vehicle route and a second vehicle route of the plurality of vehicle routes using the plurality of overlap metrics; reallocate the destination nodes of the first vehicle route and the second vehicle route to a first new route and a second new route using an ordered projection of the destination nodes onto a line passing through the first vehicle route and the second vehicle route, the first new route satisfying first capacity and timing parameters of the first vehicle route, the second new route satisfying second capacity and timing parameters of the first vehicle route; determine an overlap-optimized vehicle routing plan including the first new route and the second new route; and provide the overlap-optimized vehicle routing plan to control dispatch of a plurality of vehicles.

A ninth example embodiment includes the features of the eighth example embodiment, wherein the one or more processors are configured to execute the instructions to: construct the line to intersect a first centroid of the first vehicle route and a second centroid of the second vehicle route; determine projections of the destination nodes of the first vehicle route and the second vehicle route onto the line; order the destination nodes along the line according to the projections; and allocate the destination nodes in order along the line to a first candidate route and a second candidate route, the first candidate route satisfying the first capacity and timing parameters of the first vehicle route, the second candidate route satisfying the second capacity and timing parameters of the first vehicle route.

A tenth example embodiment includes the features of the ninth example embodiment, wherein the one or more processors are configured to execute the instructions to: if all of the destinations nodes are successfully allocated, adopt the first candidate route as the first new route and the second candidate route as the second new route if the allocating accounts for all of the destinations nodes; and if all of the destinations nodes are not successfully allocated, rotate the line by an angle and allocate the destination nodes in order along the rotated line to a first additional candidate route and a second additional candidate route, the first additional candidate route satisfying the first capacity and timing parameters of the first vehicle route, the second additional candidate route satisfying the second capacity and timing parameters of the first vehicle route.

An eleventh example embodiment includes the features of the eighth example embodiment, wherein the one or more processors are configured to execute the instructions to: repeat execution of the instructions to select and reallocate for additional pairs of vehicle routes; wherein the overlap-optimized vehicle routing plan further includes additional pairs of new routes determined by the repeated execution.

A twelfth example embodiment includes the features of the eleventh example embodiment, wherein the repeated execution is performed to account for all vehicle routes having an overlap metric satisfying an overlap optimization criterion.

A thirteenth example embodiment includes the features of the eighth example embodiment, wherein the instructions to compute the plurality of overlap metrics includes instructions to compute an overlap of polygonal hulls defining perimeters of respective vehicle routes.

A fourteenth example embodiment includes the features of the thirteenth example embodiment, wherein each of the plurality of overlap metrics accounts for a number of destination nodes of one vehicle route encroaching on the perimeter of another vehicle route.

A fifteenth example embodiment is a non-transitory memory medium configured to store instructions executable by one or more processors to perform the acts of: storing in a non-transitory memory medium a vehicle routing plan including a plurality of vehicle routes, the vehicle routing plan being optimized according to at least one optimization criterion other than an overlap criterion, each of the plurality of vehicle routes including a plurality of destination nodes for a respective vehicle and satisfying capacity and timing parameters for the respective vehicle to serve the plurality of destination nodes; computing a plurality of overlap metrics of the plurality of vehicle routes; selecting a first vehicle route and a second vehicle route of the plurality of vehicle routes using the plurality of overlap metrics; reallocating the destination nodes of the first vehicle route and the second vehicle route to a first new route and a second new route using an ordered projection of the destination nodes onto a line passing through the first vehicle route and the second vehicle route, the first new route satisfying first capacity and timing parameters of the first vehicle route, the second new route satisfying second capacity and timing parameters of the first vehicle route; determining an overlap-optimized vehicle routing plan including the first new route and the second new route; and providing the overlap-optimized vehicle routing plan to control dispatch of a plurality of vehicles.

A sixteenth example embodiment includes the features of the fifteenth example embodiment, wherein the instructions to perform the reallocating comprise instructions to perform the acts of: constructing the line to intersect a first centroid of the first vehicle route and a second centroid of the second vehicle route; determining projections of the destination nodes of the first vehicle route and the second vehicle route onto the line; ordering the destination nodes along the line according to the projections; and allocating the destination nodes in order along the line to a first candidate route and a second candidate route, the first candidate route satisfying the first capacity and timing parameters of the first vehicle route, the second candidate route satisfying the second capacity and timing parameters of the first vehicle route.

A seventeenth example embodiment includes the features of the sixteenth example embodiment, wherein the instructions to perform the reallocating comprises instructions to perform the acts of: repeating the allocating with the line rotated by an angle if the allocating does not successfully allocate all of the destinations nodes; and adopting the first candidate route as the first new route and the second candidate route as the second new route if the allocating accounts for all of the destinations nodes.

An eighteenth example embodiment includes the features of the fifteenth example embodiment, wherein the instructions are executable by the one or more processors to perform the act of: repeating the selecting and the reallocating for additional pairs of vehicle routes; wherein the determining the overlap-optimized vehicle routing plan further includes additional pairs of new routes determined by the repeating the reallocating for the additional pairs of vehicle routes.

A nineteenth example embodiment includes the features of the eighteenth example embodiment, wherein the repeating is performed to account for all vehicle routes having an overlap metric satisfying an overlap optimization criterion.

A twentieth example embodiment includes the features of the fifteenth example embodiment, wherein the act of computing the plurality of overlap metrics includes computing an overlap of polygonal hulls defining perimeters of respective vehicle routes.

A twenty-first example embodiment includes the features of the twentieth example embodiment, wherein each of the plurality of overlap metrics accounts for a number of destination nodes of one vehicle route encroaching on the perimeter of another vehicle route.

It shall be appreciated the terms "determine," "determined," "determining" and the like when utilized in connection with a control method or process, an electronic control system or controller, electronic controls, or components or operations of the foregoing refer inclusively to a number of acts, configurations, devices, operations, and techniques including, without limitation, calculation or computation of a parameter or value, obtaining a parameter or value from a lookup table or using a lookup operation, receiving parameters or values from a datalink or network communication, receiving an electronic signal (e.g., a voltage, frequency, current, or pulse-width modulation (PWM) signal) indicative of the parameter or value, receiving output of a sensor indicative of the parameter or value, receiving other outputs or inputs indicative of the parameter or value, reading the parameter or value from a memory location on a computer-readable medium, receiving the parameter or value as a run-time parameter, and/or by receiving a parameter or value by which the interpreted parameter can be calculated, and/or by referencing a default value that is interpreted to be the parameter value.

It shall be appreciated that terms such as "a non-transitory memory," "a non-transitory memory medium," and "a non-transitory memory device" refer to a number of types of devices and storage mediums which may be configured to store information, such as data or instructions, readable or executable by a processor or other components of a computer system and that such terms include and encompass a single or unitary device or medium storing such information, multiple devices or media across or among which respective portions of such information are stored, and multiple devices or media across or among which multiple copies of such information are stored.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method for optimizing vehicle route overlap in vehicle routing plans, the method comprising:

storing in a non-transitory memory medium a vehicle routing plan including a plurality of vehicle routes, the vehicle routing plan being optimized according to at least one optimization criterion other than an overlap criterion, each of the plurality of vehicle routes including a plurality of destination nodes for a respective vehicle and satisfying capacity and timing parameters for the respective vehicle to serve the plurality of destination nodes;

computing a plurality of overlap metrics of the plurality of vehicle routes;

selecting a first vehicle route and a second vehicle route of the plurality of vehicle routes using the plurality of overlap metrics;

reallocating the destination nodes of the first vehicle route and the second vehicle route to a first new route and a second new route using an ordered projection of the destination nodes onto a line passing through the first vehicle route and the second vehicle route, the first new route satisfying first capacity and timing parameters of the first vehicle route, the second new route satisfying second capacity and timing parameters of the second vehicle route, wherein said reallocating comprises:

determining the line passing through the first vehicle route and the second vehicle route, wherein the line intersects a first centroid of the first vehicle route and a second centroid of the second vehicle route, and wherein said line intersecting the first centroid of the first vehicle route and the second centroid of the second vehicle route is determined subsequent to selection of the first vehicle route and the second vehicle route using the plurality of overlap metrics;

determining projections of the destination nodes of the first vehicle route and the second vehicle route onto the line, wherein each of the destination nodes of the first vehicle route and the second vehicle route have a corresponding projection on the line;

determining a sequential order of the destination nodes of the first vehicle route and the second vehicle route, according to an order of the projections of the destination nodes onto the line;

allocating the destination nodes of the first vehicle route and the second vehicle route, in the determined sequential order, to a first candidate route until respective limits on at least one of capacity and timing parameters of the first candidate route are reached, the first candidate route satisfying the first capacity and timing parameters of the first vehicle route; and allocating remaining destination nodes of the first vehicle route and the second vehicle route, in the determined sequential order to the second candidate route, the second candidate route satisfying the second capacity and timing parameters of the second vehicle route;

determining an overlap-optimized vehicle routing plan including the first new route and the second new route; and providing the overlap-optimized vehicle routing plan to control dispatch of a plurality of vehicles.

2. The method of claim 1, wherein the reallocating comprises:

repeating the allocating with the line rotated by an angle if the allocating does not successfully allocate all of the destinations nodes; and adopting the first candidate route as the first new route and the second candidate route as the second new route if the allocating accounts for all of the destinations nodes.

3. The method of claim 1, comprising:

repeating the selecting and the reallocating for additional pairs of vehicle routes, wherein the determining the overlap-optimized vehicle routing plan further includes additional pairs of new routes determined by repeating the reallocating for the additional pairs of vehicle routes.

4. The method of claim 3, wherein the repeating is performed to account for all vehicle routes having an overlap metric satisfying an overlap optimization criterion.

5. The method of claim 1, wherein the computing the plurality of overlap metrics includes computing an overlap of polygonal hulls defining perimeters of respective vehicle routes.

6. The method of claim 5, wherein each of the plurality of overlap metrics accounts for a number of destination nodes of one vehicle route encroaching on the perimeter of another vehicle route.

7. A system for optimizing vehicle route overlap in vehicle routing plans, the system comprising:

a non-transitory memory medium configured to store instructions for processing a vehicle routing plan including a plurality of vehicle routes, the vehicle routing plan being optimized according to at least one optimization criterion other than an overlap criterion, each of the plurality of vehicle routes including a plurality of destination nodes for a respective vehicle and satisfying capacity and timing parameters for the respective vehicle to serve the plurality of destination nodes; and one or more processors configured to execute the instructions stored in the non-transitory memory medium to:

compute a plurality of overlap metrics of the plurality of vehicle routes;

select a first vehicle route and a second vehicle route of the plurality of vehicle routes using the plurality of overlap metrics;

reallocate the destination nodes of the first vehicle route and the second vehicle route to a first new route and a second new route using an ordered projection of the destination nodes onto a line passing through the first vehicle route and the second vehicle route, the first new route satisfying first capacity and timing parameters of the first vehicle route, the second new route satisfying second capacity and timing parameters of the second vehicle route, wherein reallocating the destination nodes of the first vehicle route and the second vehicle route comprises:

determining the line passing through the first vehicle route and the second vehicle route, wherein the line intersects a first centroid of the first vehicle route and a second centroid of the second vehicle route, and wherein said line intersecting the first centroid of the first vehicle route and the second centroid of the second vehicle route is determined subsequent to selection of the first vehicle route and the second vehicle route using the plurality of overlap metrics;

determining projections of the destination nodes of the first vehicle route and the second vehicle route onto the line, wherein each of the destination nodes of the first vehicle route and the second vehicle route have a corresponding projection on the line;

determining a sequential order of the destination nodes of the first vehicle route and the second vehicle route, according to an order of the projections of the destination nodes onto the line;

allocating the destination nodes of the first vehicle route and the second vehicle route, in the determined sequential order, to a first candidate route until respective limits on at least one of capacity and timing parameters of the first candidate route are reached, the first candidate route satisfying the first capacity and timing parameters of the first vehicle route; and allocating remaining destination nodes of the first vehicle route and the second vehicle route, in the determined sequential order to the second candidate route, the second candidate route satisfying the second capacity and timing parameters of the first vehicle route;

determine an overlap-optimized vehicle routing plan including the first new route and the second new route; and provide the overlap-optimized vehicle routing plan to control dispatch of a plurality of vehicles.

8. The system of claim 7, wherein the one or more processors are configured to execute the instructions to:

if all of the destinations nodes are successfully allocated, adopt the first candidate route as the first new route and the second candidate route as the second new route if the allocating accounts for all of the destinations nodes; and if all of the destinations nodes are not successfully allocated, rotate the line by an angle and allocate the destination nodes in order along the rotated line to a first additional candidate route and a second additional candidate route, the first additional candidate route satisfying the first capacity and timing parameters of the first vehicle route, the second additional candidate route satisfying the second capacity and timing parameters of the second vehicle route.

9. The system of claim 7, wherein the one or more processors are configured to execute the instructions to:

repeat execution of the instructions to select and reallocate for additional pairs of vehicle routes, wherein the overlap-optimized vehicle routing plan further includes additional pairs of new routes determined by the repeated execution.

10. The system of claim 9, wherein the repeated execution is performed to account for all vehicle routes having an overlap metric satisfying an overlap optimization criterion.

11. The system of claim 7, wherein the instructions to compute the plurality of overlap metrics includes instructions to compute an overlap of polygonal hulls defining perimeters of respective vehicle routes.

12. The system of claim 11, wherein each of the plurality of overlap metrics accounts for a number of destination nodes of one vehicle route encroaching on the perimeter of another vehicle route.

13. A non-transitory memory medium configured to store instructions executable by one or more processors to perform the acts of:

storing in a non-transitory memory medium a vehicle routing plan including a plurality of vehicle routes, the vehicle routing plan being optimized according to at least one optimization criterion other than an overlap criterion, each of the plurality of vehicle routes including a plurality of destination nodes for a respective vehicle and satisfying capacity and timing parameters for the respective vehicle to serve the plurality of destination nodes;

computing a plurality of overlap metrics of the plurality of vehicle routes;

selecting a first vehicle route and a second vehicle route of the plurality of vehicle routes using the plurality of overlap metrics;

reallocating the destination nodes of the first vehicle route and the second vehicle route to a first new route and a second new route using an ordered projection of the destination nodes onto a line passing through the first vehicle route and the second vehicle route, the first new route satisfying first capacity and timing parameters of the first vehicle route, the second new route satisfying second capacity and timing parameters of the second vehicle route, wherein said reallocating comprises:

determining the line passing through the first vehicle route and the second vehicle route, wherein the line to intersects a first centroid of the first vehicle route and a second centroid of the second vehicle route, and wherein said line intersecting the first centroid of the first vehicle route and the second centroid of the second vehicle route is determined subsequent to selection of the first vehicle route and the second vehicle route using the plurality of overlap metrics;

determining projections of the destination nodes of the first vehicle route and the second vehicle route onto the line, wherein each of the destination nodes of the first vehicle route and the second vehicle route have a corresponding projection on the line;

determining a sequential order of the destination nodes of the first vehicle route and the second vehicle route, according to an order of the projections of the destination nodes onto the line;

allocating the destination nodes of the first vehicle route and the second vehicle route, in the determined sequential order, to a first candidate route until respective limits on at least one of capacity and timing parameters of the first candidate route are reached, the first candidate route satisfying the first capacity and timing parameters of the first vehicle route; and allocating remaining destination nodes of the first vehicle route and the second vehicle route, in the determined sequential order to the second candidate route, the second candidate route satisfying the second capacity and timing parameters of the second vehicle route;

determining an overlap-optimized vehicle routing plan including the first new route and the second new route; and providing the overlap-optimized vehicle routing plan to control dispatch of a plurality of vehicles.

14. The non-transitory memory medium of claim 13, wherein the instructions to perform the reallocating comprises instructions to perform the acts of:

repeating the allocating with the line rotated by an angle if the allocating does not successfully allocate all of the destinations nodes; and adopting the first candidate route as the first new route and the second candidate route as the second new route if the allocating accounts for all of the destinations nodes.

15. The non-transitory memory medium of claim 13, wherein the instructions are executable by the one or more processors to perform the act of:

repeating the selecting and the reallocating for additional pairs of vehicle routes, wherein the determining the overlap-optimized vehicle routing plan further includes additional pairs of new routes determined by the repeating the reallocating for the additional pairs of vehicle routes.

16. The non-transitory memory medium of claim 15, wherein the repeating is performed to account for all vehicle routes having an overlap metric satisfying an overlap optimization criterion.

17. The non-transitory memory medium of claim 13, wherein the act of computing the plurality of overlap metrics includes computing an overlap of polygonal hulls defining perimeters of respective vehicle routes.

18. The non-transitory memory medium of claim 17, wherein each of the plurality of overlap metrics accounts for a number of destination nodes of one vehicle route encroaching on the perimeter of another vehicle route.

* * * * *